Aug. 7, 1951 C. F. TEICHMANN ET AL 2,562,968
PROSPECTING
Filed March 9, 1948
2 Sheets-Sheet 1

INVENTORS.
CHARLES F. TEICHMANN
ARTHUR H. LORD, JR.
BURTON D. LEE
BY Daniel Stryker
ATTORNEY

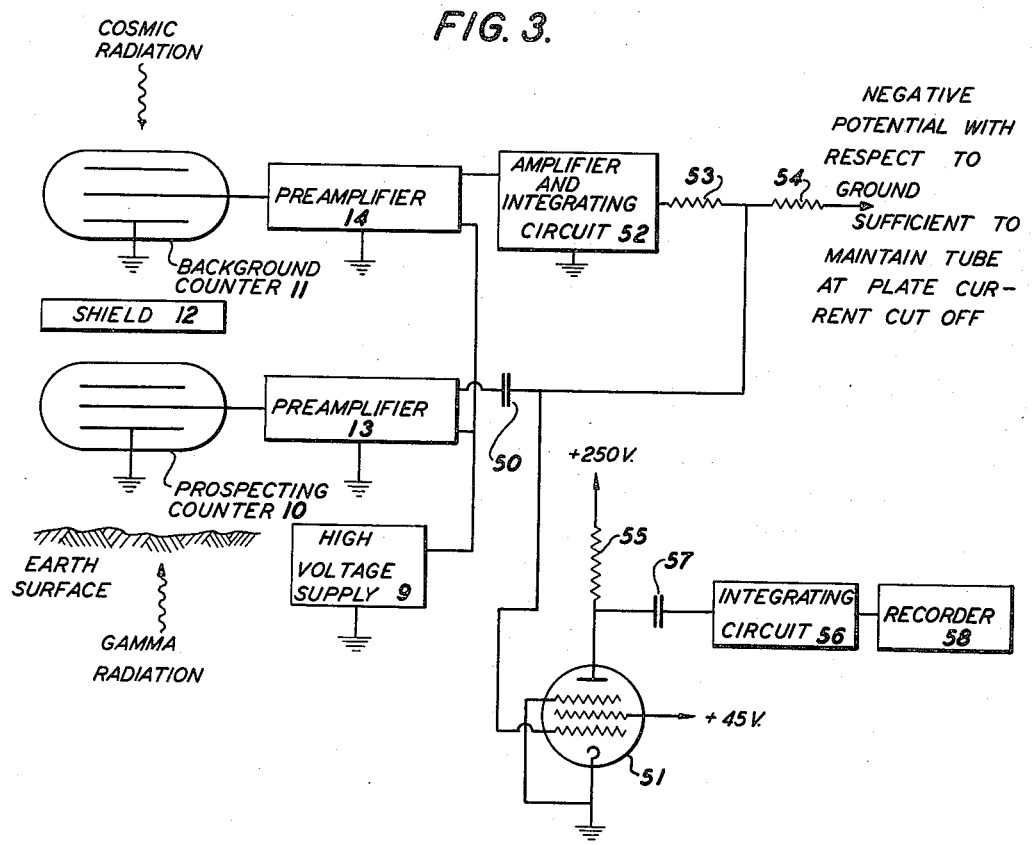
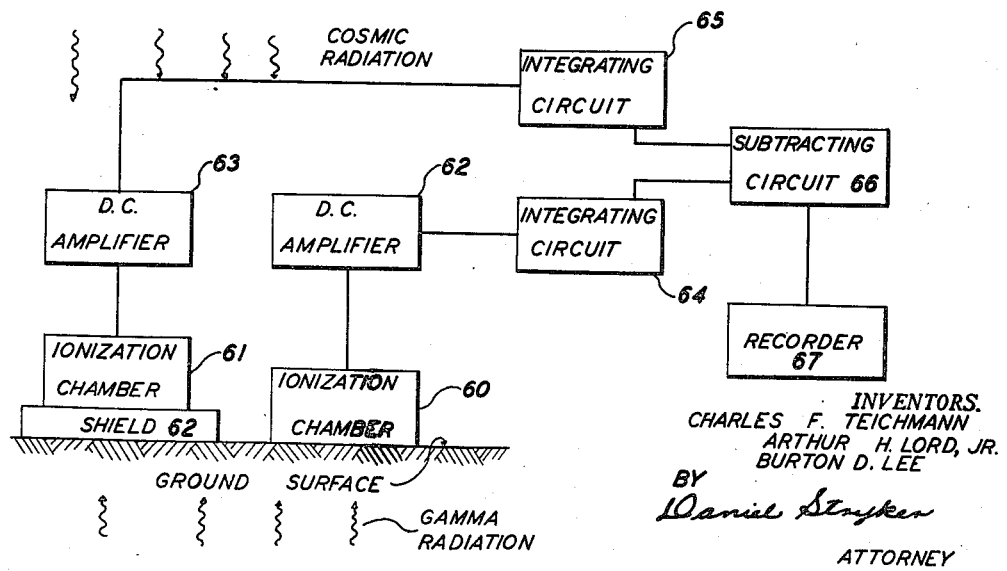

Patented Aug. 7, 1951

2,562,968

UNITED STATES PATENT OFFICE 2,562,968

PROSPECTING

Charles F. Teichmann, Mount Vernon, N. Y., and Burton D. Lee and Arthur H. Lord, Jr., Houston, Tex., assignors to The Texas Company, New York, N. Y., a corporation of Delaware Application March 9, 1948, Serial No. 13,846

4 Claims. (Cl. 250—83.6)

This invention relates to prospecting, and particularly to the measurements of the intensity of gamma rays emitted from an earth surface. It provides methods and apparatus for increasing the accuracy of such measurements and is useful in a variety of operations including well logging, geological mapping of contacts, outcrops, etc., with instruments employed on the ground or airborne. It may also be applied to the discovery of deeply buried mineral deposits through the detection of differences in the intensity of gamma radiation emitted by different portions of the substantially barren country rock or overburden in or under which the deposit occurs.

As disclosed in co-pending application Serial No. 13,842, filed March 9, 1948, it has been discovered that ore bodies may be revealed through detection of variations of gamma radiation between points so far removed from the ore body itself as to be, for all practical purposes, beyond the range at which significant differences of intensity of gamma rays originating in the ore body are detectable. In short, a gamma ray detector, if it is sufficiently efficient and is employed for a sufficiently long time at each point where a measurement of gamma ray intensity is measured, may be used to discover significant differences in the gamma ray emission from a plurality of locations in the overburden or country rock. These differences constitute an anomaly which indirectly reveals the presence of the ore body. The method finds its major application in prospecting for ore bodies of non-radioactive metals such as iron, copper, lead, tin, zinc, etc. The country rock in which such deposits occur generally shows significant deviations in gamma ray intensity from which the existence and location of the deposits may be determined. In other words, the deposits have faintly radioactive auras which, if properly detected, act as markers for the deposits, whether or not the deposits themselves are radioactive.

Barren country rocks, i. e. those in which there is no substantial content of commercial minerals, particularly the non-radioactive metallic minerals, are in general radioactive to some extent, and may show radioactivity equal to several micro-micrograms of radium per gram of rock. It is the relatively slight differences in this radioactivity of the overburden or country rock, particularly gamma ray intensity, at spaced points in proximity to an ore body which indicate the presence of the latter.

Gamma rays are emitted sporadically and at random and unless the observation time is long enough the count taken at any point may not be representative of the source. Moreover, even though the counting efficiency be increased or the time made long enough to counteract this tendency to error, significant differences may be obscured by variations in "background." A detector which is sensitive to gamma rays is also sensitive to cosmic rays, and hence these contribute to the variable background. Cosmic rays originate in the universe and at present it is accepted that the original cosmic rays consist of protons. During the travel of these particles through the atmosphere they produce secondary rays, namely mesotrons, electrons, and gamma rays, and at the earth's surface a mixture of all of the foregoing constituents is found and directed generally downward. The gamma ray constituents of the cosmic radiation may be stopped to some degree by interposing a shield of lead or the like, the background due to this radiation being correspondingly reduced. The electrons and mesotrons of the cosmic radiation are very penetrating and the thickness of shielding required to keep these from affecting the gamma ray detector is prohibitive.

Cosmic radiations vary with latitude and altitude. There are also diurnal variations, i. e. as between day and night, and irregular variations, probably attributable to magnetic storms. The variations due to altitude are the greatest and may be quite large when a survey is made with an airborne gamma ray detector or when the terrain on which the survey is made is mountainous—a common condition in mining districts. All contribute to variations in the "background" of a gamma ray detector and may obscure the slight differences of gamma ray intensity upon which prospecting depends.

In accordance with the instant invention we reduce the effect of cosmic rays and other background in prospecting procedures involving the measurement of the intensities of gamma rays originating in the earth by employing two detectors (or banks thereof) one of which (the prospecting detector) detects a higher proportion of gamma rays than the other (called the background detector). However, both detectors have a relatively high and preferably the same efficiency in the detection of background radiation (such as cosmic rays). The required difference in the sensitivity of the detectors for gamma radiation may be obtained in a number of ways; viz.

1. By making the cathode area per unit active volume lower in one detector than in the other;

2. By making the cathode of one detector of material of low atomic number, say aluminum or beryllium, and making the cathode of the other detector of material having a high atomic number, say tantalum or tungsten;

3. By interposing an absorption shield for gamma rays between the earth and one of the counters and omitting such a shield in the case of the other counter, i. e. by differential shielding.

The two detectors are placed near each other and within range of substantial gamma radiation from the earth. They are thus subjected to approximately the same amount of cosmic radiation and (save for shielding) to substantially the same gamma radiation from the earth. The outputs of the two detectors are subtracted from each other electrically, and the difference is measured. In other words, a large portion of the background (which tends to obscure contrast between gamma ray intensities from different earth locations or different earth samples) is cancelled out and the accuracy of the investigation thereby increased.

Various types of gamma ray detectors, including ionization chambers, conventional Geiger-Mueller counters, crystal type detectors (for example, those employing a diamond as the detecting element), detectors employing a napthalene screen upon which gamma rays produce scintillations that are amplified by a photo multiplier tube, and multiple plate detectors such as those described and claimed in United States Patent No. 2,397,071, granted March 19, 1946, may be employed in the practice of the invention. In general, the prospecting counter should have high efficiency for gamma rays and the background counter a low efficiency, while both should have approximately equal counting efficiency for the background, principally cosmic rays.

These and other aspects of our invention will be understood thoroughly in the light of the detailed description of presently preferred practices taken in conjunction with the accompanying drawings in which:

Fig. 3 is a diagram illustrating another type of subtractive circuit for use in the practice of the invention; and Fig. 4 is a block diagram illustrating the use of ionization chambers as detectors for the practice of the invention.

Figure 1:
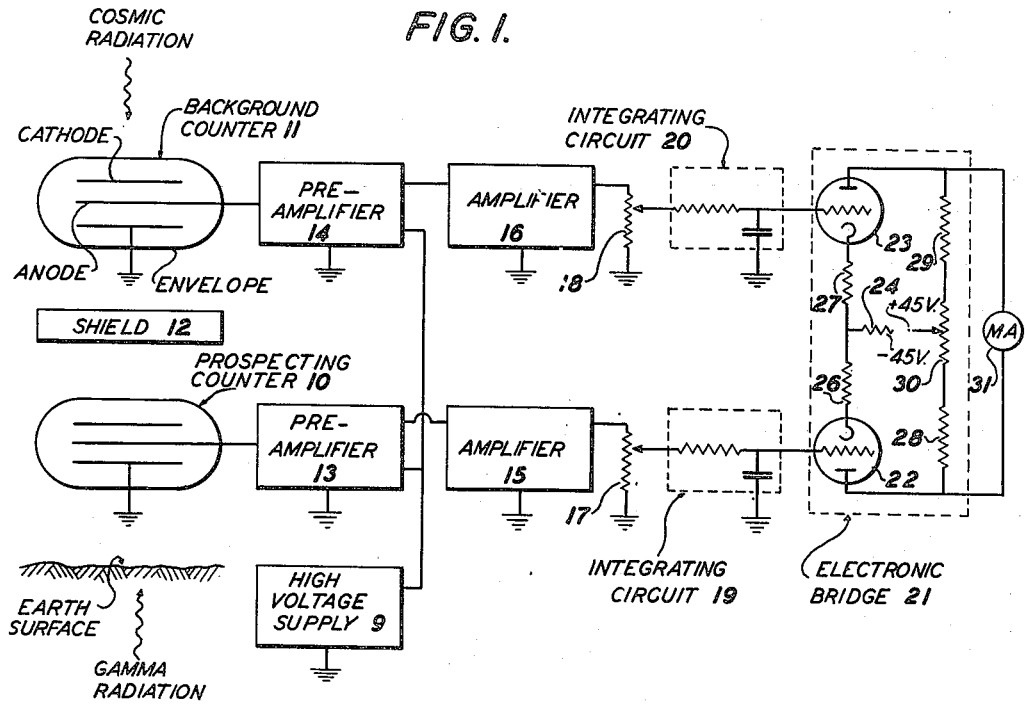
Fig. 1 is a diagram illustrating one form of apparatus suitable for the practice of the invention.

Referring to Fig. 1, gamma radiation from the earth in an area being prospected passes toward radiation detectors 10, 11, say Geiger-Mueller counters, which are disposed close together within range of the gamma radiation. The first detector 10, called the "prospecting counter" is not shielded from the earth, but the second detector 11, called the "background counter" is so shielded by means of a lead shield 12. Both detectors receive cosmic radiation, although the less penetrating portion of this radiation is intercepted and at least partially absorbed by the shield in passing to the prospecting counter. The counters are of conventional construction, each consisting of a cylindrical cathode, a coaxial wire anode, and a gas filled envelope in which the anode and the cathode are disposed.

The anodes of the two detectors receive a high D. C. potential from a common voltage supply 9 through individual preamplifiers 13, 14 (which may also include conventional quenching circuits), the circuit from the detectors to the high voltage supply being completed through the grounded cathodes.

The preamplified output of each detector is separately amplified in amplifiers 15, 16 and the output of these amplifiers is impressed respectively across potentiometers 17, 18. The sliders of the potentiometers are connected respectively with integrating circuits 19, 20 each of which is of conventional R-C design with a resistance coupled to ground through a condenser. The resistances or the condensers or both may be made variable in order to change the integrating or "time" constants of the circuits.

The two integrating circuits are connected to an electronic bridge 21 of known type in which two triodes 22, 23 are the principal elements. Thus the outputs of the two integrating circuits are connected respectively to the control grids of these tubes. The cathodes of the two triodes are connected to the negative side of a bridge circuit voltage supply through a common resistor 24 and two cathode resistors 26, 27. The plates of the two tubes are connected respectively through resistances 28, 29 to the ends of a potentiometer 30, the slider of which connects to the positive side of the voltage supply for the bridge circuit. The positive side of the voltage supply, as shown, conveniently is maintained at plus 45 volts and the negative side at minus 45 volts. An indicator 31, say a milliammeter, is connected between the two plates.

The apparatus of Fig. 1 is adapted to cancel out an unwanted background count which is a part of the total count received by the prospecting detector. This background count, due principally to cosmic rays, is separately detected by the background detector, which is substantially insensitive to the gamma radiation from the earth due to the presence of the shield. The average D. C. potential developed in the integrating circuit 20 associated with the background counter is essentially proportional to the unwanted background, while the average D. C. potential developed in the other integrating circuit 19 at the same time is essentially proportional to the sum of the unwanted background and the gamma radiation from the earth, the intensity of which is sought.

The electronic bridge circuit is so designed that with no voltage applied to either control grid a condition of electrical balance is attained with no potential difference between the two plates. This null condition, as indicated by the milliammeter, may be attained by adjusting the slider of the potentiometer 30, for example, while both of the counters are exposed to the same radiation, i. e. with the shield removed.

A potential applied to either grid will upset balance by changing the magnitude of plate current in the two tubes in opposite directions, resulting in a deflection of the meter. The direction of deflection of the meter depends on the sign of the potential applied.

The grid of one tube is controlled by one counter. The grid of the other tube is controlled by the other counter. If the potentials applied to the two grids have the same sign (either plus or minus) each tube tends to move the indicator in a direction opposed by the other. The resulting deflection is proportional to the difference in the magnitude of the two potentials applied. In other words the net deflection is generally proportional to the gamma radiation emitted by the earth, the effect of the background having been effectively cancelled out.

Figure 2:
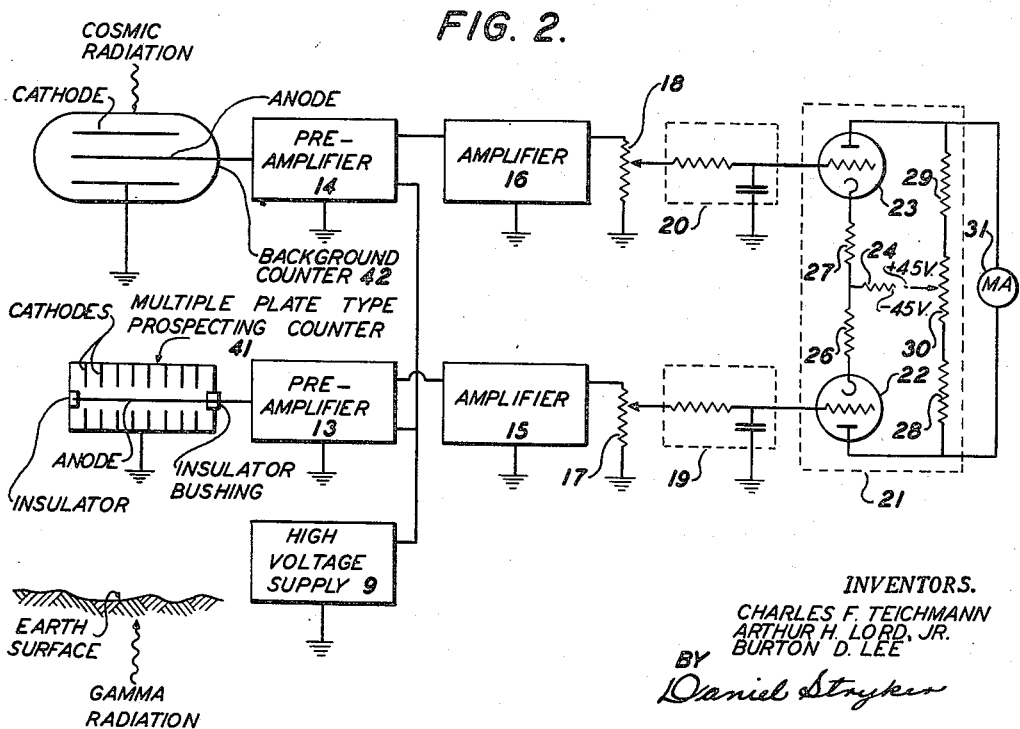
Fig. 2 illustrates a modification of the apparatus of Fig. 1.

The apparatus of Fig. 2 is identical with that of Fig. 1, except that means other than shielding is employed to give different counting efficiency for gamma rays in the two counters while maintaining substantially equal efficiencies in the two counters as far as background is concerned.

Thus in the apparatus of Fig. 2, the shield is omitted and a prospecting counter 41 having a high efficiency for gamma rays is employed in conjunction with a background counter 42 which has a low efficiency for gamma rays, the two counters being placed close together so as to be subject to approximately equal cosmic ray influences.

The prospecting counter 41 has a relatively high counting efficiency for gamma rays, say 2.5%, by reason of its construction. It is of the multiple-cathode type of counter described and claimed in United States Patent No. 2,397,071, granted March 19, 1946, and comprises a plurality of thin cathode plates spaced from each other in a stack with orifices through which an anode wire runs perpendicular to the major surfaces of the plates between insulators. The plates are fastened to a metallic envelope through which they are grounded in parallel because of the relatively large cathode area per unit of active volume, the prospecting counter is much more efficient for gamma rays than is the background counter, which is of conventional Geiger-Mueller construction.

The difference in efficiency for gamma rays in the two counters may be increased further by employing a cathode of material of low atomic number, say aluminum, in the background counter and cathodes of high atomic number, say tantalum, in the prospecting counter.

The background counter of Fig. 2 has a high efficiency for cosmic radiation and the other components of background, but a low efficiency for gamma rays. The prospecting counter has the same efficiency for background but an increased efficiency for gamma rays. The difference in the counts of the two detectors for the same time interval, as determined by the integrating circuits, is therefore essentially proportional to the gamma ray intensity from the earth. The apparatus of Fig. 2 thus accomplishes a result generally similar to that of Fig. 1, and by eliminating at least part of the background, increases contrast between measurements taken at different points on an earth surface or between measurements of different rock samples.

In the apparatus of Figs. 1 and 2, the magnitude of the voltage introduced into either of the integrating circuits, 19, 20 may be varied by changing the settings of the respective potentiometers 17, 18. Adjustment of these potentiometers may be desirable to increase contrast between measurements.

The apparatus of Fig. 3 is another means of employing a background counter to reduce the effect of unwanted radiation on the prospecting counter. The detectors employed may be arranged according to either Fig. 1 or Fig. 2, but for purposes of illustration that of Fig. 1 has been selected. Thus the counters 10, 11, the high voltage supply 9, the shield 12, and the preamplifiers 13, 14 of Fig. 3 are identical with those of Fig. 1 in design and arrangement.

The output of the preamplifier 13 of the prospecting counter is impressed through a coupling condenser 50 on the control grid of a pentode 51.

The output of the other preamplifier is connected to the input of an amplifier and integrating circuit 52, the output of which is connected through resistances 53, 54 to a source of negative potential with respect to ground that is sufficient to maintain the pentode at plate current cut-off. A lead from a point between the two resistors is connected to the control grid of the pentode.

The pentode is energized by a positive voltage applied to its plate through a plate load resistor 55, the cathode of the tube being grounded. The screen grid and the suppressor grid are connected in conventional fashion, as shown, and either may be omitted, although not without sacrifice of sharpness of resolution in this amplification stage.

An integrating circuit 56 is coupled between plate and plate load resistor through a coupling condenser 57 and the output of the integrating circuit goes to a recorder 58, say a recording milliammeter.

The pentode acts as the final pulse amplifier for pulses from the prospecting counter, and also acts as the driver of the recorder through the integrating circuit 56. The average D. C. potential developed in the integrating circuit 56 is obtained by averaging the pulses which it receives during a pre-determined time period. This average D. C. potential is influenced by the number of pulses received during this time period and also by their shape, width, and amplitude. Control of any of these variables controls the average D. C. potentials. In this case the amplitude of the pulses is controlled through the grid circuit of the vacuum tube 51.

A fixed potential is applied through the resistance 54 to the control grid such that the tube is maintained at or slightly below plate current cut-off (if the effect of the other potentials supplied to this grid are neglected). An average D. C. potential proportional to the radiation intensity observed by the background counter is obtained from its associated amplifier and integrating circuit. This potential, having been made negative with respect to common ground, is applied to the control grid through the resistor 53.

The interaction of the bias voltage supplied through the resistor 54, the average D. C. potential supplied by the amplifier and integrating circuit 52, and the pulses supplied by the coupling condenser 50, determines the voltage at the control grid. This in turn controls the amplitude of the pulses supplied to the integrating circuit 56, the output of which will be essentially proportional to the intensity observed by the prospecting detector less some function of the intensity of the radiation observed by the background detector. The circuit of Fig. 3, like those of Figs. 1 and 2, is therefore essentially subtractive in its action.

In the practice of the invention, it is not essential to employ counter types of radiation detectors, i. e. those which respond to individual rays. Thus ionization chambers may be employed as detectors. Moreover, it is not necessary that a shield, if one is employed, be interposed between the two detectors. The application of ionization chambers and the use of a shield which does not intercept cosmic radiation passing to the prospecting detector are illustrated in Fig. 4, wherein an ionization chamber 60 (the prospecting detector) is disposed on the ground from which gamma radiation is emitted, with a second ionization chamber 61 (the background detector) disposed nearby, so as to be subject to cosmic radiation of substantially the same intensity, but shielded from the gamma radiation of the earth by a shield 62, say a thick lead plate. Both chambers are subject to cosmic rays from above. The outputs of the two ionization chambers are connected respectively with conventional D. C. amplifiers 62, 63, which in turn are connected respectively through integrating circuits 64, 65 to a subtractive circuit 66. The output of the subtractive circuit 66 is sent to a recorder 67.

The operation of the apparatus of Fig. 4 is as follows:

The ionization chamber employed as a prospecting counter receives the full gamma radiation from the ground plus the full background and its output is a D. C. potential which varies as the radiation observed. The other ionization chamber receives full background but substantially no detectable gamma radiation, due to the shielding and likewise produces a D. C. potential which varies as the radiation it observes. The two outputs are amplified, integrated and subtracted from each other essentially as in the apparatus of Figs. 1, 2 and 3 and the difference, essentially representative of gamma radiation alone is observed.

The invention is applicable to prospecting generally and to the location of contacts, faults, etc., as well as buried mineral deposits.

We claim:

1. In geophysical investigations involving the determination of the intensity of gamma radiation emitted from an earth surface in one direction in the presence of cosmic rays approaching the earth from a different direction, the improvement which comprises detecting the intensity of the gamma radiation emitted from the earth together with the penetrating component of the cosmic radiation with a first detector while it is substantially unshielded on the side from which said gamma waves arrive, simultaneously detecting the intensity of the cosmic radiation with a second detector disposed near the first and substantially unshielded on the side from which the cosmic waves arrive, the proportion of gamma rays from the earth detected in the first detector being higher than the proportion of gamma rays from the earth detected in the second detector, and measuring the difference in the intensities of the radiation detected by the respective detectors.

2. In geophysical investigations involving the determination of the intensity of gamma radiation emitted from the earth in the presence of cosmic rays including gamma rays and more penetrating components travelling toward the earth, the improvement which comprises detecting the intensity of the gamma radiation from the earth and the cosmic radiation with a detector which is substantially unshielded in both directions so that the more penetrating component of the cosmic radiation and the gamma radiation from the earth and the gamma ray component of the cosmic radiation are all detected in this detector, simultaneously detecting the intensity of the cosmic radiation with a second detector disposed near the first and shielded on the side from which the gamma waves arrive from the earth but substantially unshielded in the opposite direction so that a substantial proportion of the gamma radiation from the earth is excluded from the second detector while the cosmic radiation is substantially transmitted, and measuring the difference in the intensities of the radiation detected by the respective detectors.

3. In geophysical investigations involving the determination of the intensity of gamma radiation emitted from the earth in the presence of cosmic rays including gamma rays and a more penetrating component travelling toward the earth, the improvement which comprises detecting the intensity of the gamma radiation with a detector while shielding it in the direction from which the cosmic rays arrive but not in the direction from which the gamma waves arrive from the earth so as to exclude a substantial proportion of the gamma ray component of the cosmic radiation from the detector, simultaneously detecting the intensity of the cosmic rays with a second detector disposed near the first detector while shielding the second detector in the direction from which the gamma rays arrive from the earth but not in the direction from which the cosmic rays arrive so as to exclude a substantial proportion of the gamma rays from the earth from the detector, and measuring the difference in the intensity of the radiation detected by the respective detectors.

4. In geophysical investigations for determining the intensity of gamma radiation emitted by the earth in the presence of cosmic radiation from above the earth and including gamma radiation and a component having a higher penetrating power than the gamma radiation, the improvement which comprises simultaneously admitting into two radiation detectors disposed close together the gamma radiation from the earth and the cosmic radiation, the average intensity of the radiation admitted to the respective detectors being substantially equal, detecting the combined admitted gamma radiation from the earth and cosmic radiation simultaneously in both of the detectors but detecting a higher proportion of the admitted gamma radiation in one of the detectors than in the other and detecting the more penetrating component with substantially the same efficiency in both detectors, and measuring the difference in the intensities of the combined radiation detected by the respective detectors.

CHARLES F. TEICHMANN.
BURTON D. LEE.
ARTHUR H. LORD, Jr.

REFERENCES CITED

The following references are of record in the file of this patent:

UNITED STATES PATENTS

| Number | Name | Date |
|---|---|---|
| 2,285,840 | Scherbatskoy | June 9, 1942 |

OTHER REFERENCES

Richtmeyer and Kennard: Introduction to Modern Physics, McGraw-Hill Book Co., 1947, pp. 682 and 683.

Ridland: Transactions of A. I. M. M. E., vol. 164, Geophysics 1945, pp. 117-124.